Sept. 24, 1968     J. M. TAYLOR     3,402,816

PORTABLE GRAVEL HANDLING APPARATUS

Original Filed July 22, 1965

INVENTOR.
JOSEPH M. TAYLOR

United States Patent Office 3,402,816
Patented Sept. 24, 1968

3,402,816
PORTABLE GRAVEL HANDLING APPARATUS
Joseph M. Taylor, Cape Elizabeth, Maine, assignor to Machinery Incorporated, Maine, a corporation of Maine
Original application July 22, 1965, Ser. No. 473,936. Divided and this application Aug. 8, 1966, Ser. No. 570,797
2 Claims. (Cl. 209—260)

ABSTRACT OF THE DISCLOSURE

A hopper for gravel material with a grizzly over the mouth thereof hinged to one end and swung about its hinge to discharge large pieces of material collected on the grizzly.

---

This application is a division of my application Ser. No. 473,936, filed July 22, 1965.

The invention comprises a receiving means in the form of a hopper into which raw material consisting of stones, sand and the like of many different grades may be dumped, the top of the hopper having a grizzly thereover which prevents very large pieces of material entering the hopper and with a means for clearing the top of the grizzly as occasion should require. The hopper acts as a funnel to direct the gravel of various grades onto a conveyor, the conveyor and hopper being mounted upon an axle having wheels so that the same may be portable.

An object of the invention is to provide an apparatus which may be controlled by fluid motors which may be readily carried upon the frame of the apparatus.

Another object of the invention is to provide a hopper with a grizzly over its mouth with means for easily discharging large material collected on the grizzly.

Another object of the invention is to control the grizzly in its movement.

With these and other objects in view, the invention consists of certain novel features of construction as will be more fully described and particularly pointed out in the appended claims.

Figure 1:
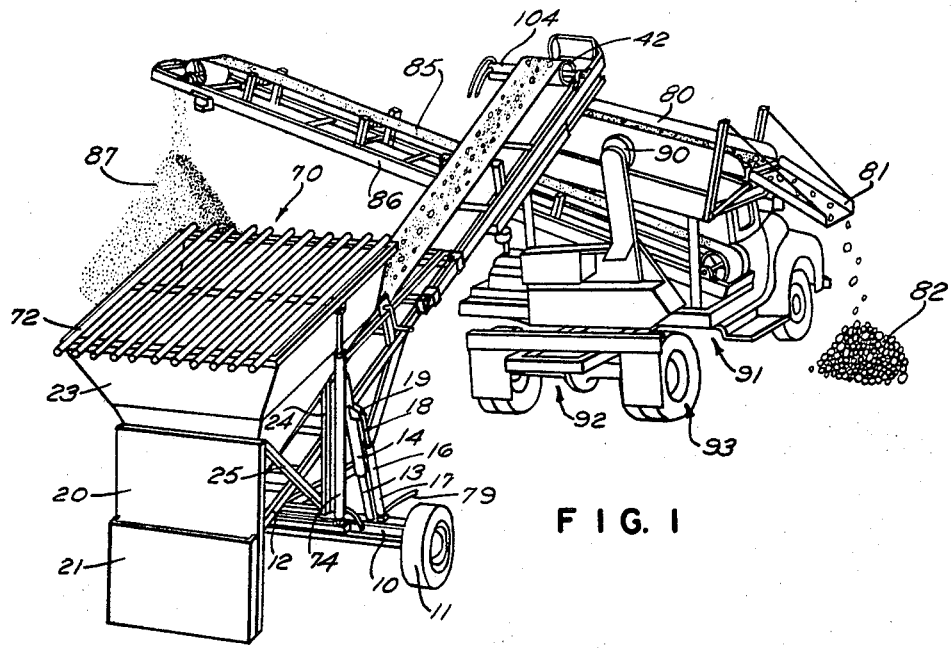
FIG. 1 is a perspective view of the entire apparatus.

With reference to FIG. 1 of the drawings, an axle 10 is provided with wheels 11 at either end, and upon this axle there is mounted a frame 12 in such a manner that the frame may be moved up and down relative to the axle. The mounting comprises telescoping members designated generally 13 and 14, the tube 14 being fixed to the frame 12 and supported by struts 15, while the rod 13 is fixed to the axle 10 and is slidable through the tube 14. A fluid motor 16 which may be served by compressed air has its cylinder 17 fixed to the axle 10 with its plunger 18 fixed to the tube 14 between ears 19 projecting therefrom so that when fluid is utilized for forcing the plunger 18 upwardly out of its cylinder 17, the frame will be raised. This frame 12 also is provided with a leg 20 at one end having a pocket 21 which may receive some weighting means. A hopper 23 is mounted upon this frame 12 utilizing the leg 20 as a support therefor and also is supported with a stanchion 24 and a diagonal brace 25. This hopper has sides and end walls terminating in an opening closely adjacent to the belt which will be described.

The belt 40 is mounted in the frame 12 and extends closely adjacent the mouth of the hopper. This belt 40 extends about a pulley 41 at one end of a frame and a pulley 42 at the other or leading end of the frame.

Upon the top of the hopper 23 there is mounted a grizzly 70 which comprises a rectangular frame 71 upon which a series of bars 72 are fixed. This grizzly is hingedly mounted along one end of the hopper as at 73 so that it may be swung about this hinge to incline it from the horizontal position shown in FIG. 1 to the inclined position shown in FIG. 2. A motor device 74 comprises a cylinder 75 and a ram 76 hinged upon the frame 12 as at 77 and hinged to the grizzly as at 78 so that when power is applied at tube 79, the grizzly may be moved to the inclined position as referred to above.

In the opertaion of the apparatus so far described, a load of gravel may be dumped upon the grizzly 70, and most of it will pass through the bars 72. Some big chunks of rock or the like may be retained on the grizzly. The material in the hopper is then funneled onto the conveyor belt 40 which will be elevated in the position to a desired height substantially as shown in FIG. 1, and this material will be dumped over the end of the conveyor into a screening separator. In FIG. 1, the material is shown as being fed to a trough 80 which has a screen bottom of a mesh such that fine sand-like particles will pass through the screen, while larger gravel particles will not pass through the screen but by reason of the inclination of the bottom surface of the screen will be discharged by means of the trough 81 into the pile 82 or in a truck. The sand-like particles which do pass through the screen will be deposited on the conveyor belt 85 supported in a framework 86 and be discharged into the pile 87 or into a truck which may be beneath the end of this conveyor. The screen is agitated by an eccentric 90 with a suitable motor source mounted in the framework 91 which is pivoted on the truck or tractor 92 supported by wheels 93.

Figure 2:
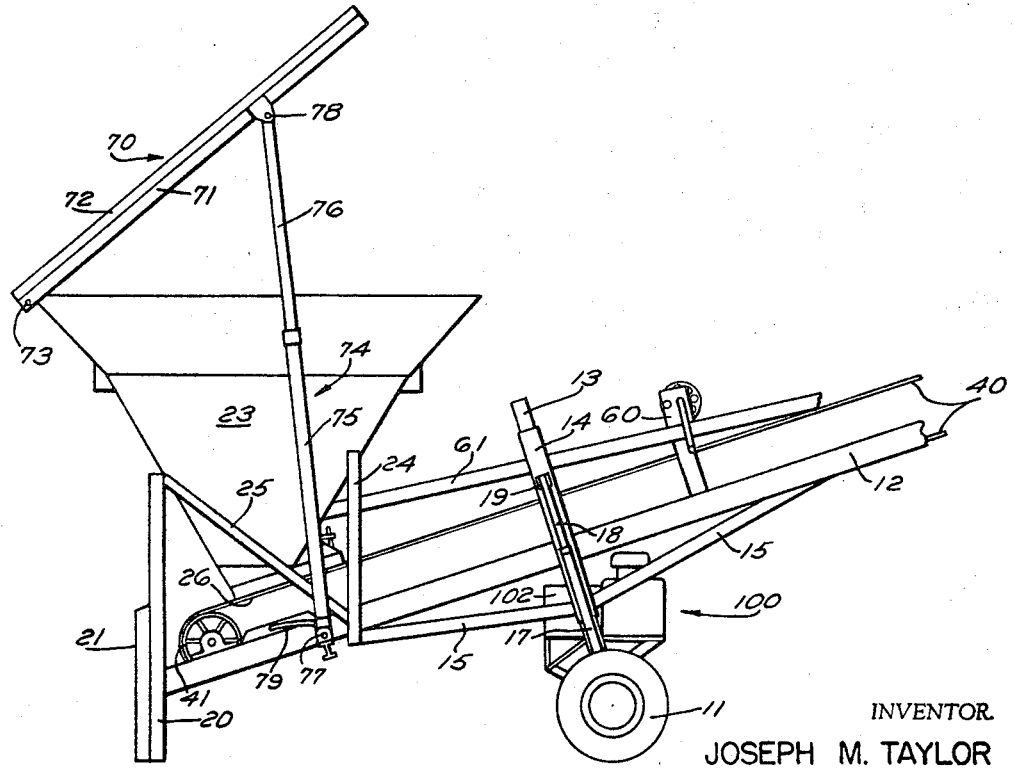
FIG. 2 is an elevation of a part of the conveyor of the apparatus for directing the work to the separating screen.

In order to power this apparatus, a motor 100 is mounted upon the axle 10 (note FIG. 2). This power comprises a fluid pump 102 to compress fluid in a tank which may then be utilized for the fluid motors heretofore mentioned, 16 and 74. Likewise, fluid might be utilized for driving a motor to drive eccentric 90 for vibrating the screen 80.

I claim:

1. In a portable gravel handling apparatus, an elongated frame mounted on wheels, a hopper carried by said frame adjacent one end thereof, said hopper having side walls defining a bottom discharge and a top loading mouth, said mouth being defined by at least a pair of opposed edges and a pair of opposed ends, a grizzly over the mouth of said hopper and extending beyond the mouth on each end and in overhanging relation to said opposed edges, means for hinging the grizzly on an axis transverse of said frame at one end of the hopper mouth, second hinge means connected to and located beneath the overhanging side of the grizzly intermediate the first hinging means and the opposite end, and motor means at the side of the hopper mouth located idrectly beneath the overhanging side of the grizzly and connected to said second hinge means and to said frame operable to raise the grizzly and discharge material on the top thereof.

2. In a portable gravel handling apparatus as in claim 1 wherein the said motor means comprisces a telescoping clyinder and ram pivotally connected to said frame and to said second hinge means on the side of the grizzly intermediate the ends of said grizzly.

References Cited

UNITED STATES PATENTS

| 311,485 | 2/1885 | Gridley | 209—420 |
| 966,294 | 8/1910 | Arps | 209—420 |
| 1,460,571 | 7/1923 | Carey | 209—260 |
| 2,107,532 | 2/1938 | Hallenbeck | 209—260 |
| 2,396,954 | 3/1946 | Kranz | 209—260 |
| 2,690,840 | 10/1954 | Kohlmier | 209—260 |
| 3,003,265 | 10/1961 | Lutjens | 209—421 |

FOREIGN PATENTS 18,484　8/1893　Great Britain.

HARRY B. THORNTON, *Primary Examiner.*

R. HALPER, *Assistant Examiner.*